United States Patent [19]

Okamoto et al.

[11] Patent Number: 5,148,318
[45] Date of Patent: Sep. 15, 1992

[54] OPTICAL PULSE WAVEFORM SHAPER

[75] Inventors: Tatsuki Okamoto; Shigeo Ueguri; Kazuhiko Hara; Akihiko Iwata; Yoshihiro Ueda, all of Hyogo, Japan

[73] Assignee: Mitsubishi Denki K.K., Tokyo, Japan

[21] Appl. No.: 309,728

[22] PCT Filed: May 26, 1988

[86] PCT No.: PCT/JP88/00507
§ 371 Date: Jan. 30, 1989
§ 102(e) Date: Jan. 30, 1989

[87] PCT Pub. No.: WO88/09521
PCT Pub. Date: Dec. 1, 1988

[30] Foreign Application Priority Data

May 29, 1987 [JP] Japan ................................ 62-136699
Aug. 13, 1987 [JP] Japan ................................ 62-200899

[51] Int. Cl.⁵ ............................................. G02B 27/10
[52] U.S. Cl. ..................................... 359/629; 359/634
[58] Field of Search ............... 350/163, 171, 172, 174, 350/401, 173; 359/490, 494, 495, 583, 585, 589, 618, 629, 634

[56] References Cited

U.S. PATENT DOCUMENTS

| 2,685,228 | 8/1954  | Kavanagh ........................ 350/163 |
| 4,019,151 | 4/1977  | Brueckner et al. ................ 350/174 |
| 4,059,759 | 11/1977 | Harney et al. .................... 350/169 |
| 4,155,628 | 5/1979  | Schlossberg ...................... 350/171 |
| 4,351,589 | 9/1982  | Chavel et al. .................... 350/388 |
| 4,627,688 | 12/1986 | Kubayashi et al. ................ 350/173 |
| 4,655,562 | 4/1987  | Kreitzer et al. .................. 350/538 |

FOREIGN PATENT DOCUMENTS

| 0106413 | 8/1980 | Japan ................................ 350/174 |
| 0571788 | 9/1977 | U.S.S.R. ........................... 350/174 |

Primary Examiner—Bruce Y. Arnold
Assistant Examiner—R. D. Shafer
Attorney, Agent, or Firm—Kanesaka & Takeuchi

[57] ABSTRACT

An optical pulse waveform shaper capable of providing an optical pulse waveform of a desired intensity distribution with little loss. The optical pulse beam split by a beam splitter is directed into the beam splitter with a phase difference to combine with the transmitted optical pulse beam. The phase difference is controllable. The optical pulse waveform shaper is applicable between a laser oscillator with different exciting conditions and an amplifier.

3 Claims, 7 Drawing Sheets

F I G . 4
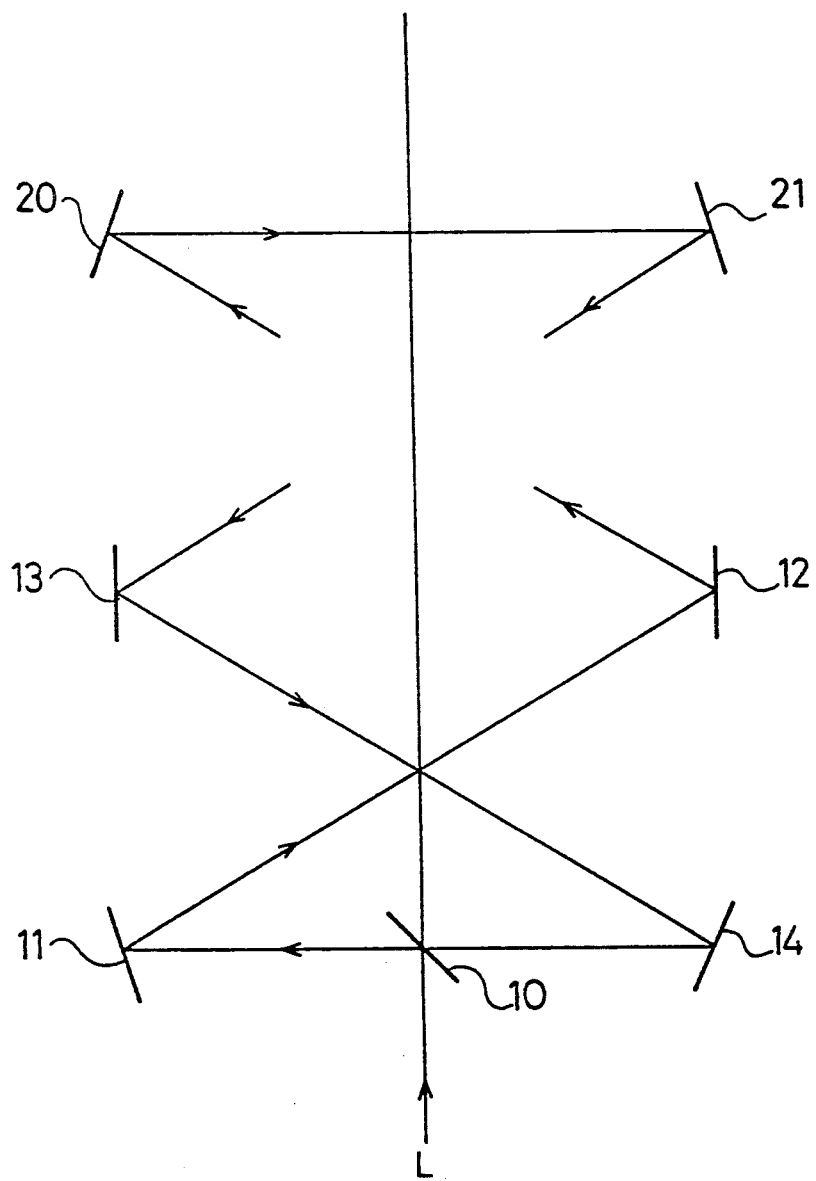

OPTICAL PULSE WAVEFORM SHAPER

TECHNICAL FIELD

The present invention relates to an optical pulse waveform shaper provided between a laser oscillator with different exciting conditions and an amplifier or between a pair of amplifiers to provide an optical pulse waveform of a desired intensity distribution with little loss.

BACKGROUND ART

A conventional optical pulse waveform shaper such as shown in the Laser Handbook, page 365, published by the Laser Gakkai (Laser Society) in 1982 is illustrated in FIG. 1. It includes three beam splitters 1, 2, 3 for splitting an input beam L, and a pair of reflectors 4, 5 and three beam splitters 6, 7, 8 for combining the split beams $L_1$, $L_3$, $L_5$, $L_6$ to provide an output beam $L_9$.

The operation will now be described below.

An input optical pulse beam L is split into a reflected beam $L_1$ and a transmitted beam $L_2$ by the beam splitter 1. The transmitted beam $L_2$ is split into a reflected beam $L_3$ and a transmitted beam $L_4$ by the beam splitter 2. The transmitted beam $L_4$ is split into a reflected beam $L_5$ and a transmitted beam $L_6$ by the beam splitter 3. Thus, the respective beams $L_1$, $L_3$, $L_5$, $L_6$ are different from each other in phase and attenuation. The beam $L_1$ is reflected by the reflector 5 and combined with the beam $L_3$ into a beam $L_7$ by the beam splitter 6. The beams $L_7$ and $L_5$ are combined into a beam $L_8$ by the beam splitter 7. The beam $L_8$ is combined with the beam $L_6$ reflected by the reflector 4 into an output beam $L_9$ by the beam splitter 8. Thus, the output beam $L_9$ has been shaped to have a desired intensity distribution.

In such conventional optical pulse waveform shaper, part of the beam $L_3$ reflected by the beam splitter 2 is transmitted by the beam splitter 6 resulting in an optical pulse energy loss. Part of the beam L1 reflected by the reflector 5 is reflected by the beam splitter 6 resulting in an optical pulse energy loss. In addition, two sets of beam splitters 1–3 and 6–8 for splitting and combining, respectively, must be designed and manufactured. Moreover, it is not easy to align all these optical axes.

Although the optical pulse waveform $L_9$ of a desired intensity distribution may be shaped when the input optical pulse waveform L has an even intensity distribution, it has been impossible to provide an optical pulse waveform of a desired intensity distribution for an input optical pulse waveform of an intensity distribution in which the central portion leads the peripheral portion or vice versa.

Accordingly, it is an object of the invention to provide an optical pulse waveform shaper capable of combining the split optical pulse beams with little loss.

It is another object of the invention to provide an optical pulse waveform shaper capable of providing an optical pulse waveform of a desired intensity distribution from that of a given intensity distribution with little loss.

DISCLOSURE OF THE INVENTION

According to one aspect of the invention there is provided an optical pulse waveform shaper which includes a beam splitter for splitting an input optical beam into a transmitted optical beam and a reflected optical beam; and a plurality of reflectors for reflecting the reflected optical beam to provide a phase difference with respect to the transmitted optical beam before the reflected optical beam is combined with the transmitted optical beam by the beam splitter.

With the optical pulse waveform shaper, the optical pulse beam reflected by the beam splitter is combined with the optical pulse beam transmitted by the beam splitter by a plurality of reflectors thereby minimizing the optical pulse energy loss.

According to another aspect of the invention there is provided an optical pulse waveform shaper which includes a beam splitter for splitting an input optical pulse beam into first and second optical pulse beams, the transmittance of a portion of the beam splitter being different from that of another portion, and at least three reflectors for providing a phase difference to the first optical pulse beam and combining the first and second optical pulse beams into an output optical pulse beam through the beam splitter.

In this embodiment, an input optical pulse beam is split into two optical pulse beams by the beam splitter. One of the split beams is provided with a phase difference by the reflectors and reflected by the beam splitter to be combined with the second beam into an output optical pulse beam.

BRIEF DESCRIPTION OF THE DRAWING

FIG. 4 is a schematic diagram of an optical pulse waveform shaper according to another embodiment of the invention;

BEST MODE FOR PRACTICING THE INVENTION

Figure 1:
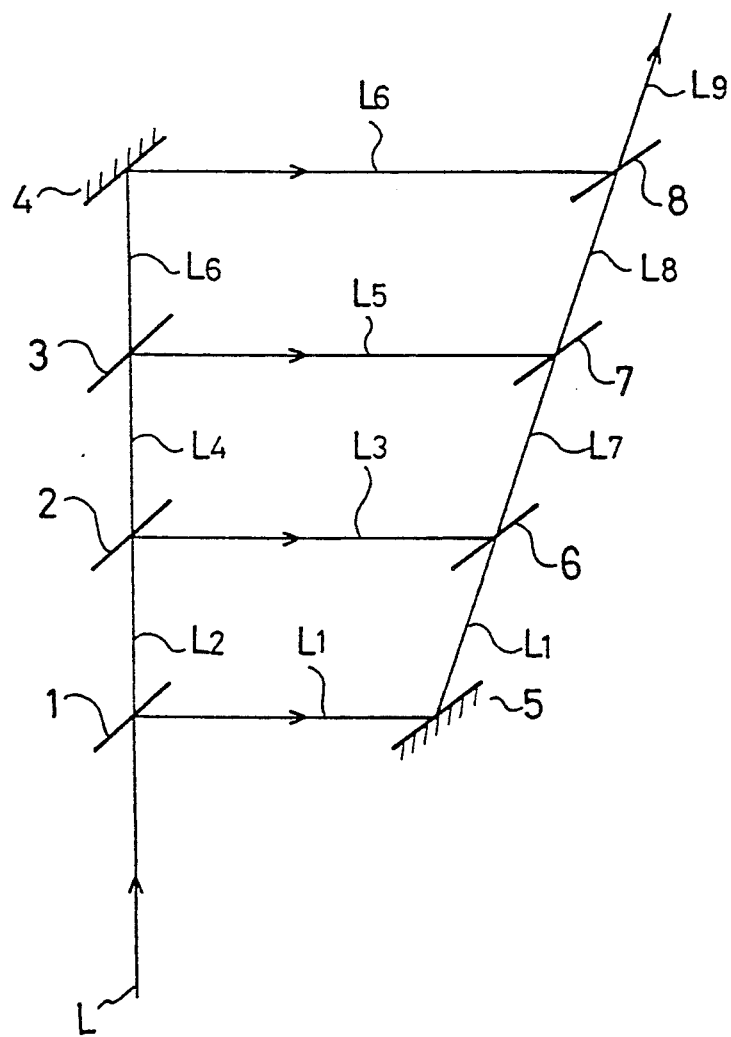
FIG. 1 is a schematic diagram of a conventional optical pulse waveform shaper.
Figure 2:
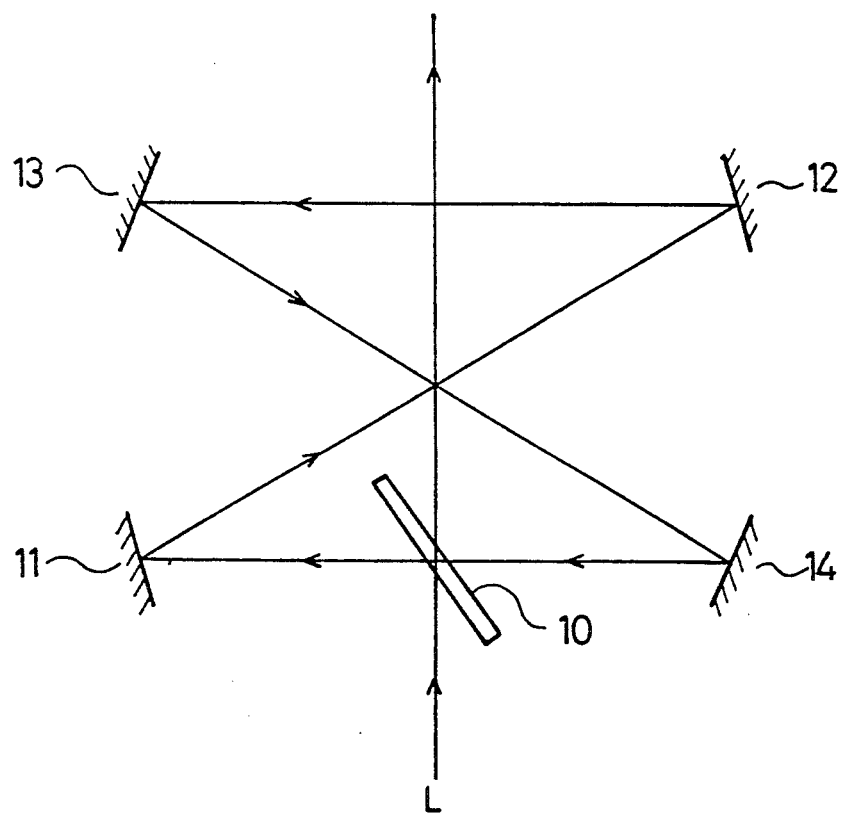
FIG. 2 is a schematic diagram of an optical pulse waveform shaper according to an embodiment of the invention.

In FIG. 2, a beam splitter 10 for splitting an input optical pulse L is made by coating a surface of a plane parallel plate with a reflective material and the other surface with a non-reflective material. Four total reflectors 11–14 (hereinafter simply "reflectors") cooperate to provide the split optical pulse beam with a phase difference and combine it with the transmitted optical pulse beam. The reflectors 11–14 are plane mirrors. The axis of the optical pulse reflected by the reflector 14 agrees with the axis of the optical pulse reflected by the beam splitter 10. The axis of the optical pulse reflected again by the beam splitter 10 agrees with the axis of the optical pulse transmitted by the beam splitter 10.

In operation, an optical pulse is split by the beam splitter 10. The reflected optical pulse is provided with a desired phase difference and then combined by the reflectors 11–14. The desired phase difference is determined by controlling the length of an optical path; namely, the distance between the beam splitter 10 and the reflectors 11, 14, the distance between the respective reflectors, and the number of reflectors.

Part of the optical pulse reflected by the reflector 14 is transmitted by the beam splitter 10 but reflected the reflectors 11-14 for a few cycles and output after all.

Figure 3A:
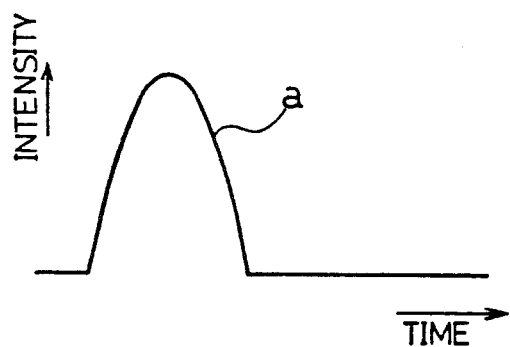
FIGS. 3(a)–3(c) are waveform diagrams showing optical pulse waveforms output from the waveform shaper of FIG. 2.
Figure 3B:
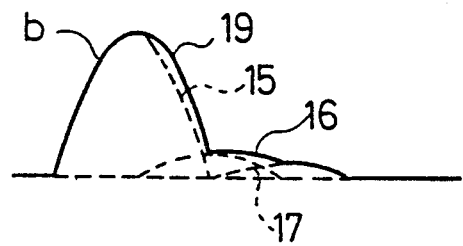
Figure 3C:
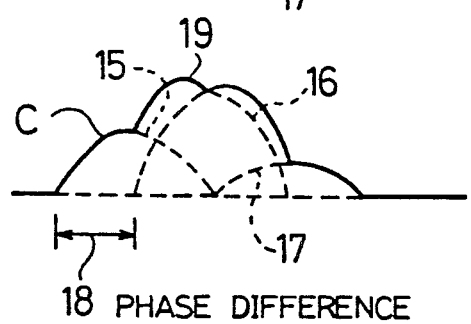

FIG. 3 shows the operation of the above optical pulse waveform shaper. a is an input optical pulse waveform. 15 is the waveform of the optical pulse transmitted by the beam splitter 10. 16 is the waveform of the optical pulse reflected by the beam splitter 10 and the reflectors 11-14 and then the beam splitter 10 after one round trip. 17 is the waveform of the optical pulse reflected by the beam splitter 10 and then by the beam splitter 10 after two round trips through the reflectors 11-14. 18 is the phase difference controlled by the aforementioned techniques. 19 is the shaped pulse waveform.

b is the shaped optical pulse waveform 19 provided with a large transmittance of the beam splitter 10. The rise time of the optical pulse b is equal to that of the input pulse a, but the waveform b has a long tailing portion.

c is the shaped optical pulse waveform 19 provided with a small transmittance of the beam splitter 10. It became wider and shorter than the input waveform a.

As has been described above, according to the invention, the reflected and transmitted light from a beam splitter are combined so that the optical pulse energy loss is minimized.

Alternatively, the number of reflectors may be three or more as shown in FIG. 4. 20, 21 are reflectors. Two or more optical pulse waveform shapers may be cascaded or connected in series. With a partially coated beam splitter, a spatially shaped optical pulse may be provided. With a polarizing beam splitter, an optical pulse with polarizing spectrum in terms of time may be provided. With a spectrum beam splitter, an optical pulse with spectrum in terms of time may be provided. The beam splitter may have one or more apertures. These alternatives may be combined.

The optical pulse energy loss may be further reduced by providing the beam splitter 10 with non-reflective coating on the surfaces other than the reflective surface. Part or all of the reflectors 11-14 may be flat or curved reflectors. The substrate of the beam splitter may be a parallel or wedge plate. It may also be a plane or curved plate. With a curved plate, it is possible to provide a given diameter of the optical pulse beam by controlling the curvature of the beam splitter.

Figure 5:
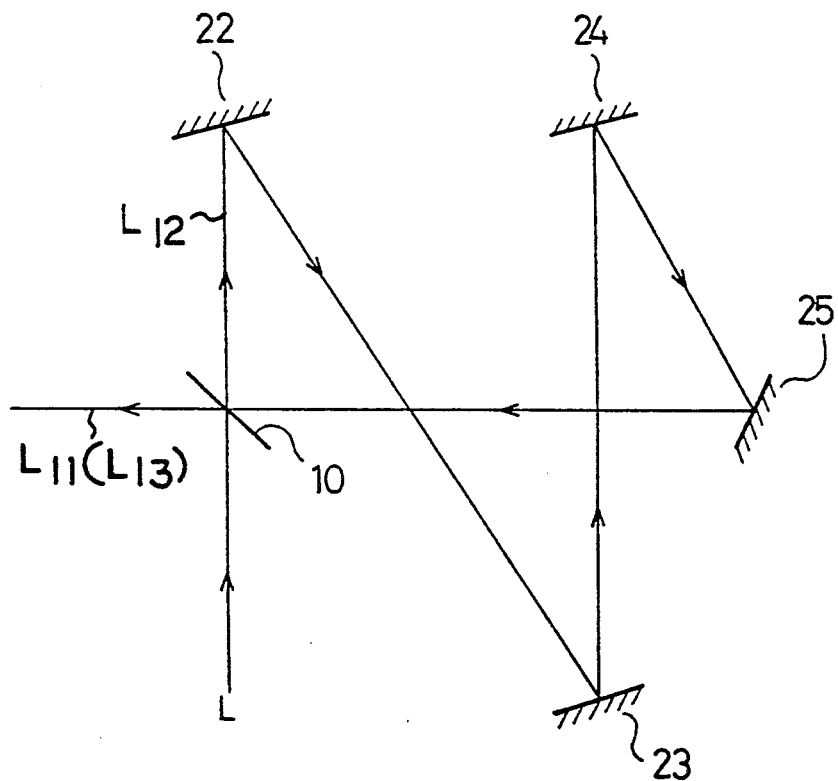
FIG. 5 is a schematic diagram of an optical pulse waveform shaper according to still another embodiment of the invention.

As shown in FIG. 5, the optical pulse $L_{12}$ transmitted by the beam splitter 10 is reflected by the reflectors 22-25 to provide a phase difference. Then, it is combined with the optical pulse $L_{11}$ reflected by the beam splitter 10 to provide the same results as those of the aforementioned embodiment.

Figure 6:
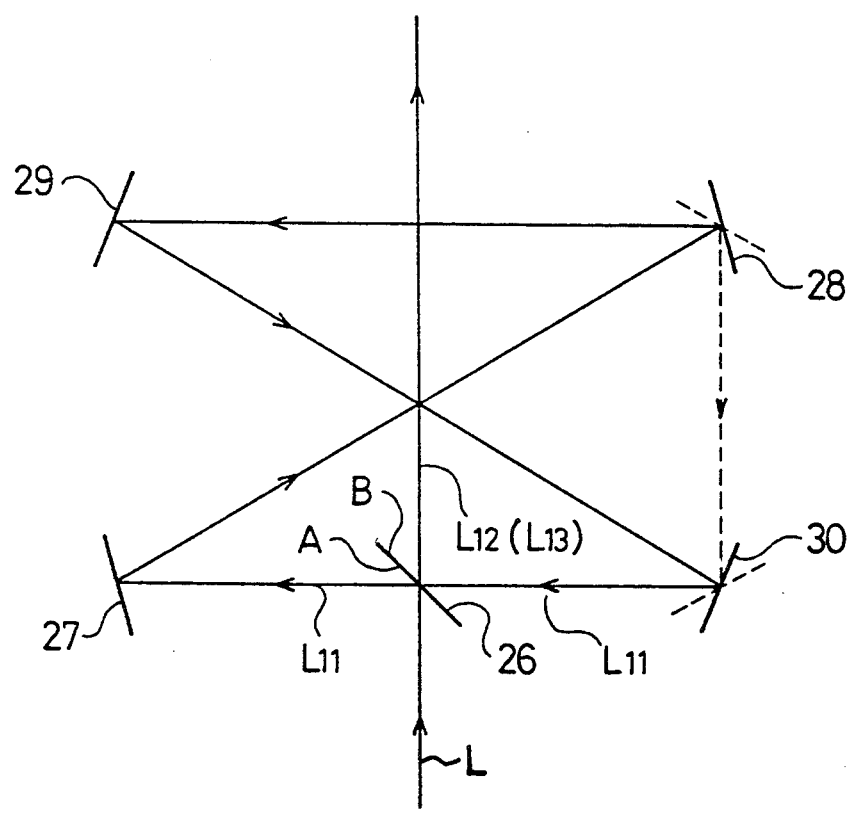
FIG. 6 is a schematic diagram of an optical pulse waveform shaper according to yet another embodiment of the invention.

In FIG. 6, a beam splitter 26 not only splits an input optical pulse beam L into two beams a reflected pulse beam $L_{11}$ and a transmitted pulse beam $L_{12}$, but also combines these two beams $L_{11}$, $L_{12}$ into an output optical pulse beam $L_{13}$. The reflective coating A is provided on a plane parallel plate such that the transmittance changes continuously. A non-reflective coating B is provided on the area other than that of the reflective coating A. Four total reflectors 27, 28, 29, 30 (hereinafter simply "reflectors") are provided to give the reflected beam $L_{11}$ a phase difference and combine it with the transmitted beam $L_{12}$. These reflectors may be flat mirrors.

The reflectors are arranged so that the optical axis of the beam $L_{11}$ reflected by the reflector 30 agrees with the optical axis of the beam $L_{11}$ reflected by the beam splitter 26 and that the optical axis of the beam $L_{11}$ reflected again by the beam splitter 26 agrees with the optical axis of the beam $L_{12}$ transmitted by the beam splitter 26.

In operation, an input optical pulse beam L is split into two beams $L_{11}$, $L_{12}$ by the beam splitter 26. The reflected beam $L_{11}$ is provided with a proper phase difference by the reflectors 27-30 and combined with the transmitted beam $L_{12}$ by the beam splitter 26 to provide an output optical pulse beam $L_{13}$. A desired value of the phase difference is obtained by controlling the length of an optical path; namely the distance between the beam splitter 26 and the reflectors 27, 30 and between the respective reflectors 12-15, and the number of reflectors used.

Figure 7A:
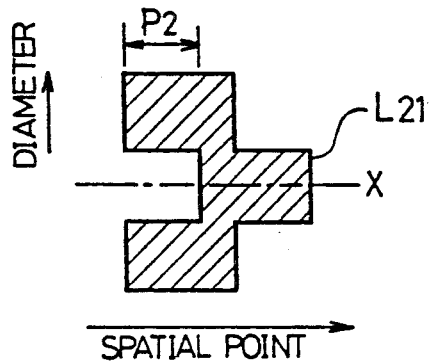
FIGS. 7(a)–7(d) are graphs showing the intensity distributions of a few optical pulse waveforms.
Figure 7B:
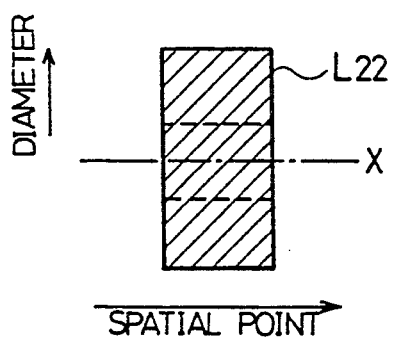
Figure 7C:
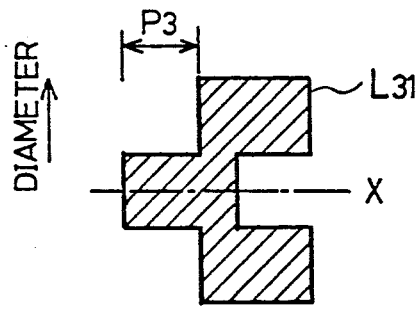
Figure 7D:
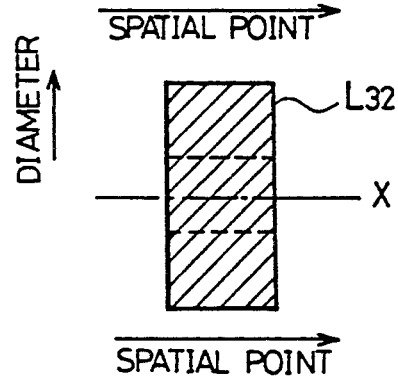

FIGS. 7(a) through 7(d) show schematically the intensity distributions of a few optical pulse waveforms. FIG. 7(a) shows an optical pulse waveform $L_{21}$ at a certain time of an intensity distribution whose central portion leads the peripheral portion. FIG. 7(b) shows an optical pulse waveform $L_{22}$ at a certain time obtained by shaping the optical pulse waveform $L_{21}$ with a beam splitter 26 whose transmittance is greater in the peripheral portion than in the central portion. FIG. 7(c) shows an optical pulse waveform $L_{31}$ at a certain time of an intensity distribution whose peripheral portion leads the central portion. FIG. 7(d) shows an optical pulse waveform $L_{32}$ at a certain time obtained by shaping the optical pulse waveform $L_{31}$ with a beam splitter 26 whose transmittance is greater in the central portion than in the peripheral portion. In each case, the transmittance of the beam splitter 26 is designed to adjust the phase difference $P_2$ or $P_3$ as described above providing the optical pulse waveform $L_{22}$ or $L_{32}$ of an even intensity distribution.

According to the invention, only one beam splitter 26 is necessary for splitting an optical pulse beam L and combining the split beams $L_{11}$, $L_{12}$. In addition, the reflected beam $L_{11}$ is totally reflected by the reflectors 27-30 so that an optical pulse of a desired intensity distribution is obtained from that of a given intensity distribution with little loss.

Alternatively, the reflectors 28, 30 may be arranged as shown in phantom in FIG. 6 to reflect the reflected beam $L_{11}$ to the reflector 30 as shown in phantom, so that the three reflectors 27, 28, 30 provide the same results as the four reflectors 27-30. Thus, the number of reflectors may be three or more. For example, six reflectors 12-17 may be used to make an optical pulse waveform shaper.

The transmittance of the beam splitter 26 may be made to change continuously to shape an optical pulse waveform of a continuously varying distribution into an optical pulse waveform of an even intensity distribution. The same results may be obtained by providing a hole in the beam splitter depending on the intensity distribution of an optical pulse waveform.

The substrate of the beam splitter 26 may be a wedge, plane, or curved plate to provide the same results. With the wedge plate, the combined optical pulse waveform $L_{13}$ has no or little ghost. The curvature of a curved plate may be constant or variable. The reflectors 27-30 may be a combination of curved and plane mirrors to provide the same results. When the beam splitter and the reflectors employ a curved plate and curved mirrors, respectively, a desired diameter of an optical pulse beam may be obtained by controlling the curvatures. The curvature of curved mirrors may be constant or variable.

The transmitted beam $L_{12}$ may be provided with a phase difference and combined with the reflected beam $L_{11}$ to provide the same results. The optical pulse waveform shaper according to the invention may be used to shape an optical pulse waveform of an even intensity distribution into an optical pulse waveform of an uneven intensity distribution.

The coating materials for providing varying transmittance include $(Al+MgF_2)$, $(Al+SiO)$, Al, $(Cr+Au)$, $(Cr+Pt)$, Cr, and dielectric multilayer films. The non-reflective coating materials include $MgF_2$. This $MgF_2$ is coated in a single or multiple layers. The optical pulse waveform shapers may be connected in series.

INDUSTRIAL APPLICABILITY

The optical pulse waveform shaper according to the invention is able to provide an optical pulse waveform of a desired intensity distribution from an optical pulse waveform of a given intensity distribution with little loss. Thus, it is applicable between a laser oscillator and an amplifier or between amplifiers.

We claim:

1. An optical pulse waveform shaper comprising:
   a beam splitter for splitting an input optical pulse beam into a reflected optical pulse beam having an optical axis perpendicular to said input optical pulse beam and a transmitted optical pulse beam having an optical axis parallel to said input optical pulse beam; and
   at least three reflectors optically aligned with one another to form an optical path therebetween thereby defining an optical plane and disposed so as to direct said reflected optical pulse beam such that said optical axes of said reflected and transmitted optical pulse beams agree to thereby combine said reflected and transmitted optical pulse beams through said beam splitter to form an output optical pulse beam,
   said output optical pulse beam being parallel to not only said optical plane but also said input optical pulse beam,
   said reflected or transmitted optical pulse beam intersecting said transmitted optical pulse beam at least twice before it is combined with said transmitted optical pulse beam, thereby minimizing said optical pulse waveform shaper.

2. The optical pulse waveform shaper of claim 1, wherein said reflected optical pulse beam is reflected by said reflectors (11-14) to provide a phase difference with respect to said transmitted optical pulse beam before it is combined with said transmitted optical pulse beam by said beam splitter (10).

3. An optical pulse waveform shaper comprising:
   a beam splitter for splitting an input optical pulse beam into a reflected optical pulse beam having an optical axis perpendicular to said input optical pulse beam and a transmitted optical pulse beam having an optical axis parallel to said input optical pulse beam;
   at least three reflectors optically aligned with one another to form an optical path therebetween thereby defining an optical plane and disposed so as to direct said transmitted optical pulse beam such that said optical axes of said reflected and transmitted optical pulse beams agree to thereby combine said reflected and transmitted optical pulse beams through said beam splitter to form an output optical pulse beam;
   said output optical pulse beam being parallel to said optical plane but perpendicular to said input optical pulse beam; and
   said transmitted optical pulse beam is reflected at a first reflector of said reflectors and is intersected by said transmitted optical pulse beam reflected from the last reflector of said reflectors, thereby minimizing said optical pulse waveform shaper.

* * * * *